United States Patent
Chao et al.

(10) Patent No.: US 12,469,232 B2
(45) Date of Patent: Nov. 11, 2025

(54) METHOD FOR GENERATING PASS-THROUGH VIEW IN RESPONSE TO SELECTED MODE AND HOST

(71) Applicant: HTC Corporation, Taoyuan (TW)

(72) Inventors: Tun-Hao Chao, Taoyuan (TW); Ci Syuan Yang, Taoyuan (TW); Jo-Han Hsu, Taoyuan (TW); Li-Wei Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 176 days.

(21) Appl. No.: 18/434,805

(22) Filed: Feb. 7, 2024

(65) Prior Publication Data

US 2024/0273830 A1   Aug. 15, 2024

Related U.S. Application Data

(60) Provisional application No. 63/445,719, filed on Feb. 15, 2023.

(51) Int. Cl.
*G06T 19/00* (2011.01)
*G06T 7/50* (2017.01)
*G06T 15/20* (2011.01)

(52) U.S. Cl.
CPC .............. *G06T 19/006* (2013.01); *G06T 7/50* (2017.01); *G06T 15/205* (2013.01)

(58) Field of Classification Search
CPC ....... G06T 19/006; G06T 7/50; G06T 15/205; G06T 7/80; G06T 15/005; G06T 2207/10028; G06T 2207/30244
See application file for complete search history.

(56) References Cited

U.S. PATENT DOCUMENTS

| | | | |
|---|---|---|---|
| 11,012,677 B1 * | 5/2021 | Bleyer | G06T 5/70 |
| 11,032,530 B1 * | 6/2021 | Bleyer | H04N 13/128 |
| 11,127,148 B1 * | 9/2021 | Edmonds | H04N 13/128 |
| 2019/0101758 A1 * | 4/2019 | Zhu | G06T 3/00 |
| 2020/0049994 A1 * | 2/2020 | Tosic Rodgers | G02B 30/00 |
| 2021/0158080 A1 * | 5/2021 | Price | G02B 27/017 |
| 2021/0158548 A1 * | 5/2021 | Price | H04N 13/25 |
| 2021/0160441 A1 * | 5/2021 | Bleyer | H04N 5/265 |
| 2021/0174570 A1 * | 6/2021 | Bleyer | G02B 27/017 |
| 2021/0358084 A1 * | 11/2021 | Bleyer | G02B 27/0093 |
| 2022/0335637 A1 * | 10/2022 | Price | G06T 7/593 |
| 2022/0351345 A1 * | 11/2022 | Price | G06T 5/50 |
| 2024/0119568 A1 * | 4/2024 | Tovchigrechko | G06T 7/10 |

* cited by examiner

*Primary Examiner* — Sarah Lhymn
(74) *Attorney, Agent, or Firm* — JCIPRNET

(57) ABSTRACT

The embodiments of the disclosure provide a method for generating a pass-through view in response to a selected mode and a host. The method includes: determining, by the host, the selected mode among a first mode and a second mode, wherein the first mode aims to achieve a control accurateness, and the second mode aims to achieve a visual smoothness; determining, by the host, a target depth map according to the selected mode; and rendering, by the host, the pass-through view based on an image associated with a field of view (FOV) of the host, a camera parameter, and the target depth map.

20 Claims, 19 Drawing Sheets

METHOD FOR GENERATING PASS-THROUGH VIEW IN RESPONSE TO SELECTED MODE AND HOST

CROSS-REFERENCE TO RELATED APPLICATION

This application claims the priority benefit of U.S. provisional application Ser. No. 63/445,719, filed on Feb. 15, 2023. The entirety of the above-mentioned patent application is hereby incorporated by reference herein and made a part of this specification.

BACKGROUND

1. Field of the Invention

The present disclosure generally relates to a mechanism for providing a reality service, in particular, to a method for generating a pass-through view in response to a selected mode and a host.

2. Description of Related Art

Nowadays, it common for users wearing head-mounted displays (HMD) to interact with the visual contents of the reality services (e.g., the virtual reality (VR) service, the augmented reality (AR) service, the mixed reality (MR) services, etc.) by using trackers (e.g., hands, handheld controllers, wearable devices, and/or any other objects whose pose is trackable to the HMD).

When the HMD is providing the visual content of the MR service, the HMD may capture the image of the real world scene near the HMD by using, for example, an RGB camera and accordingly render a pass-through view as a background of the visual content of the MR service. In this case, the user may see the real world scene from the visual content shown by the display of the HMD.

However, in the existing technology, only one mode of pass-through view is available for the developers to use during the development, which limits the implementation of MR service.

SUMMARY OF THE INVENTION

Accordingly, the disclosure is directed to a method for generating a pass-through view in response to a selected mode and a host, which may be used to solve the above technical problems.

The embodiments of the disclosure provide a method for generating a pass-through view in response to a selected mode, applied to a host. The method includes: determining, by the host, the selected mode among a first mode and a second mode, wherein the first mode aims to achieve a control accurateness, and the second mode aims to achieve a visual smoothness; determining, by the host, a target depth map according to the selected mode; and rendering, by the host, the pass-through view based on an image associated with a field of view (FOV) of the host, a camera parameter, and the target depth map.

The embodiments of the disclosure provide a host including a storage circuit and a processor. The storage circuit stores a program code. The processor is coupled to the storage circuit and accesses the program code to perform: determining a selected mode among a first mode and a second mode, wherein the first mode aims to achieve a control accurateness, and the second mode aims to achieve a visual smoothness; determining a target depth map according to the selected mode; and rendering the pass-through view based on an image associated with a field of view (FOV) of the host, a camera parameter, and the target depth map.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1A:
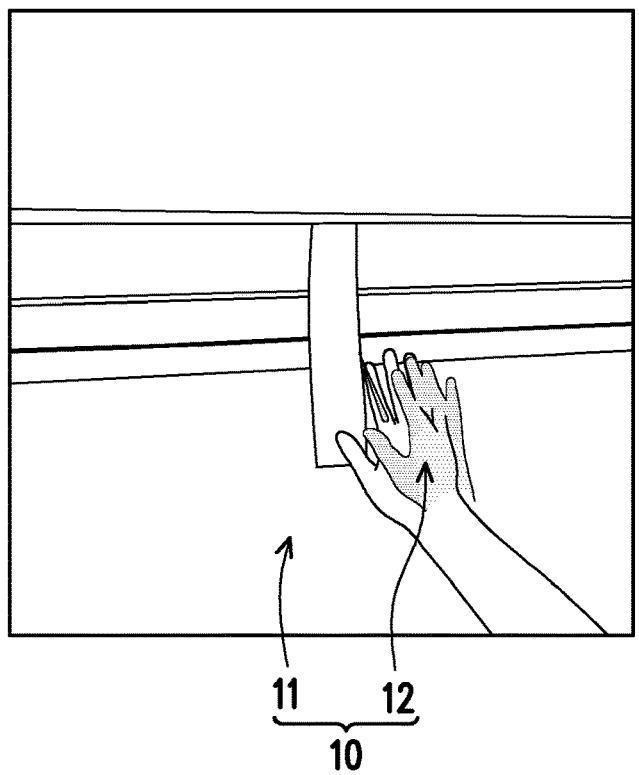
FIG. 1A shows a schematic diagram where a non-distorted pass-through view is provided according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

While providing the MR service, the HMD may further render one or more virtual objects and overlay the rendered virtual object(s) onto the pass-through view as, for example, the foreground of the visual content. Alternatively, the pass-through view can be overlaid onto the rendered virtual object, but the disclosure is not limited thereto.

For example, the HMD may track the pose of the tracker and accordingly render a virtual object corresponding to the tracker, and the HMD may overlay the virtual object onto a position corresponding to the tracker in the pass-through view, or overlay the pass-through view onto the virtual object.

However, because the 3D positions of the RGB camera and the display of the HMD are different, the developer may face a dilemma of maintaining the correctness of position/scale of the tracker in the pass-through view or providing a non-distorted pass-through view. In some cases, maintaining the correctness of position/scale of the tracker in the pass-through view is preferred, while in other cases, providing a non-distorted pass-through view is preferred.

See FIG. 1A, which shows a schematic diagram where a non-distorted pass-through view is provided according to an embodiment of the disclosure. In FIG. 1A, the visual content 10 may be an MR content, which may include the pass-through view 11 and the virtual object 12, wherein the pass-through view 11 may show the real world scene in front of the user, and the virtual object 12 may be a virtual model rendered based on, for example, the user's hand.

As can be seen from FIG. 1A, although the pass-through view 11 is (nearly) non-distorted, the scale/position of the tracker (e.g., the user's hand) therein is inaccurate, which makes the virtual object 12 not align with considered tracker (e.g., the user's hand).

In this case, when the user is experiencing the MR content, the user may be confused about which of the user's hand and the virtual object 12 that the user should refer to, which may lead to an unsatisfying user experience.

Figure 1B:
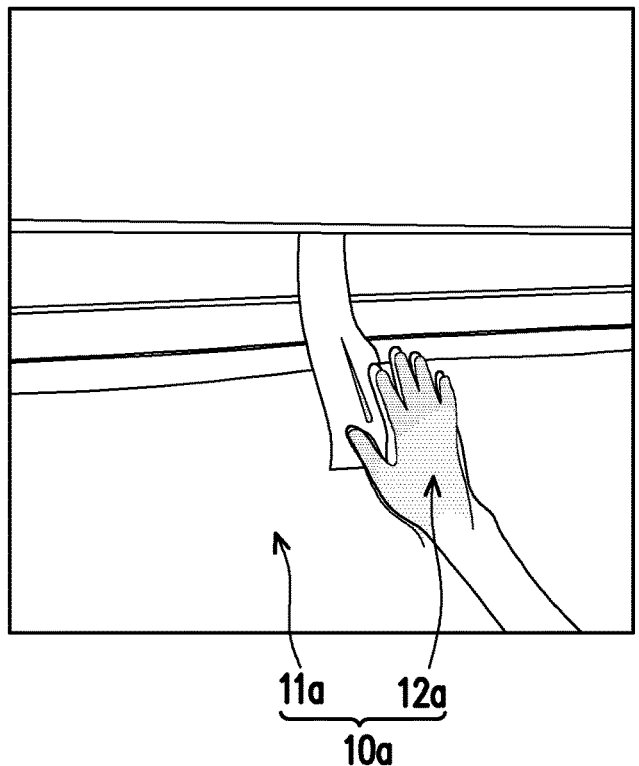
FIG. 1B shows a schematic diagram where the correctness of position/scale of the tracker in the pass-through view is maintained according to an embodiment of the disclosure.

See FIG. 1B, which shows a schematic diagram where the correctness of position/scale of the tracker in the pass-through view is maintained according to an embodiment of the disclosure. In FIG. 1B, the visual content 10a may be an MR content, which may include the pass-through view 11a and the virtual object 12a, wherein the pass-through view 11a may show the real world scene in front of the user, and the virtual object 12a may be a virtual model rendered based on, for example, the user's hand.

As can be seen from FIG. 1B, although the scale/position of the tracker (e.g., the user's hand) in the pass-through view 11a is accurate, there are some distortions existing in the pass-through view 11a (e.g., the distorted pillar near the rendered virtual object 12a). In this case, the user may not have a satisfying visual experience.

Therefore, it would be necessary to provide a solution for the developer to choose the preferred strategy (e.g., maintaining the correctness of position/scale of the tracker in the pass-through view or providing a non-distorted pass-through view) during the development.

Figure 2:
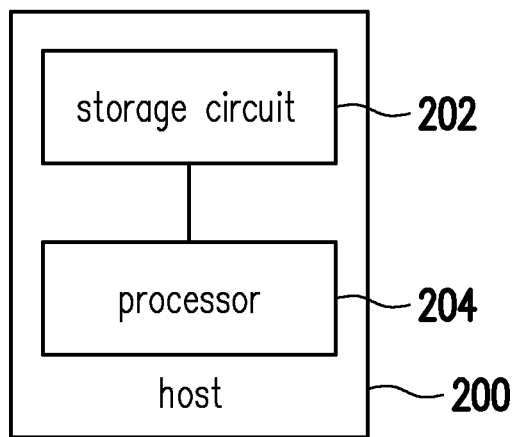
FIG. 2 shows a schematic diagram of a host according to an embodiment of the disclosure.

See FIG. 2, which shows a schematic diagram of a host according to an embodiment of the disclosure. In various embodiments, the host 200 can be any smart device and/or computer device that can provide visual contents of reality services such as VR service, AR services, MR services, and/or XR services, but the disclosure is not limited thereto. In some embodiments, the host 200 can be an HMD capable of showing/providing visual contents (e.g., AR/VR/MR contents) for the wearer/user to see. For better understanding the concept of the disclosure, the host 200 would be assumed to be an MR device (e.g., an MR HMD) for providing MR contents for the user to see, but the disclosure is not limited thereto.

In one embodiment, the host 200 can be disposed with built-in displays for showing the MR contents for the user to see. Additionally or alternatively, the host 200 may be connected with one or more external displays, and the host 200 may transmit the MR contents to the external display(s) for the external display(s) to display the MR contents, but the disclosure is not limited thereto.

In the embodiments of the disclosure, the visual content can be an MR content including the pass-through view and at least one rendered virtual object overlaying on the pass-through view. In this case, the pass-through view is used as an underlying image of the visual content. In other embodiments, the pass-through view can be overlaid onto the rendered virtual object, but the disclosure is not limited thereto.

In one embodiment, the MR content may merely include the pass-through view, i.e., there are no rendered virtual object overlaid on the pass-through view, but the disclosure is not limited thereto.

In one embodiment, the pass-through view may be rendered by a GPU of the host 200 based on the image captured by, for example, the (front) RGB camera of the host 200. In this case, the user wearing the host 200 (e.g., the HMD) can see the real-world scene in front of the user via the pass-through view in the visual content provided by the host 200.

In one embodiment, the GPU may render one or more virtual object based on the MR application currently running on the host 200, and the processor 204 can overlay the rendered virtual object on the rendered pass-through view or overlay the pass-through view onto the rendered virtual object to form/generate the visual content (e.g., the MR content).

In some embodiments, the host 200 may track the pose of one or more tracker used by the user to interact with the visual content by using tracking engines. In different embodiments, the tracker(s) may include, for example, the user's hands, handheld controller(s), and/or wearable device(s), and/or trackable object(s), and the corresponding tracking engines may include, for example, hand tracking engines for tracking the user's hand, device tracking engines for tracking the handheld controller(s), and/or wearable device(s), and/or object tracking engines for tracking the trackable object(s) but the disclosure is not limited thereto.

In some embodiments, the host 200 may obtain the depth map of the field of view (FOV) of the host 200, wherein the tracker(s) may be in the FOV of the host 200. That is, a part of the pixels in the depth map correspond to the tracker(s), but the disclosure is not limited thereto. In some embodiments, if the tracker(s) is not within the FOV of the host 200, there may be no pixels in obtained depth map corresponding to the tracker.

In different embodiments, the host 200 may obtain the depth map by using, for example, stereo cameras, lidars, time of flight (ToF) sensors, but the disclosure is not limited thereto.

In the embodiments, the FOV of the host 200 may refer to the FOV of the camera(s) (e.g., the stereo camera, the RGB camera, etc.) of the host 200.

In FIG. 2, the storage circuit 202 is one or a combination of a stationary or mobile random access memory (RAM), read-only memory (ROM), flash memory, hard disk, or any other similar device, and which records a plurality of modules and/or a program code that can be executed by the processor 204.

The processor 204 may be coupled with the storage circuit 202, and the processor 204 may be, for example, a general purpose processor, a graphic processing unit (GPU), a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 204 may access the modules and/or the program code stored in the storage circuit 202 to implement the method for dynamically showing a virtual boundary provided in the disclosure, which would be further discussed in the following.

Figure 3:
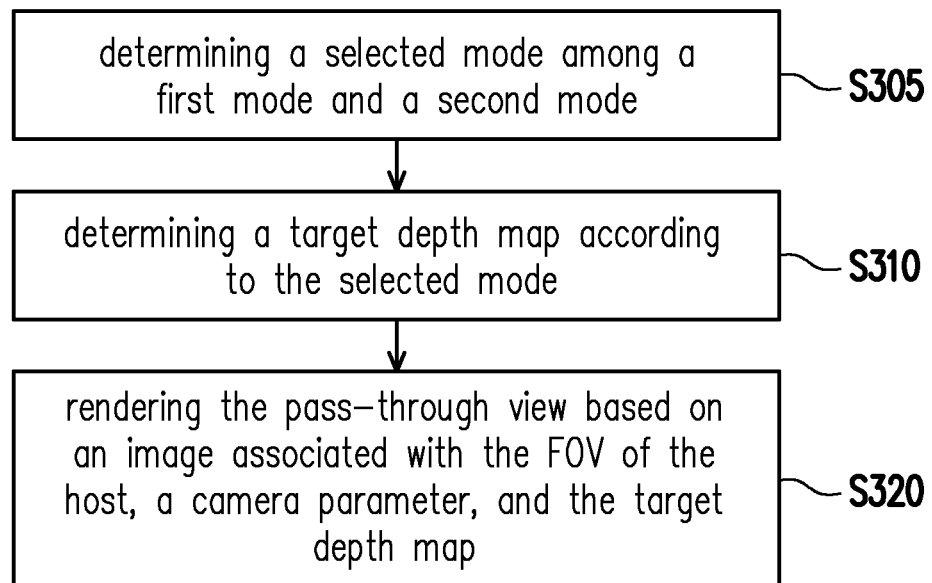
FIG. 3 shows a flow chart of the method for generating a pass-through view in response to the selected mode according to an embodiment of the disclosure.

See FIG. 3, which shows a flow chart of the method for generating a pass-through view in response to the selected mode according to an embodiment of the disclosure. The method of this embodiment may be executed by the host 200 in FIG. 2, and the details of each step in FIG. 3 will be described below with the components shown in FIG. 2.

In step S305, the processor 204 determines a selected mode among a first mode and a second mode. In the embodiments of the disclosure, the first mode may be used to maintain the correctness of position/scale of the tracker in the rendered pass-through view, and the second mode may be used to provide a non-distorted pass-through view.

In the embodiments of the disclosure, the first mode aims to achieve a control accurateness, and the second mode aims to achieve a visual smoothness. For example, if the developer needs the tracker in the rendered pass-through view to have accurate scale/position in the visual content (e.g., MR content) for facilitating the user to interact with the visual content, the developer may select the first mode as the selected mode. On the other hand, if the developer needs the rendered pass-through view to be less distorted or even non-distorted for providing a better visual quality, the developer may select the second mode as the selected mode, but the disclosure is not limited thereto.

In one embodiment, the processor 204 may provide a specific user interface for the developer to determine the selected mode. In another embodiment, the processor 204 may provide options corresponding to the first mode and the second mode in the designing environment/application of the visual content, but the disclosure is not limited thereto.

In step S310, the processor 204 determines a target depth map according to the selected mode. In various embodiments, step S310 can be performed in different ways, which would be introduced in the following.

Figure 4A:
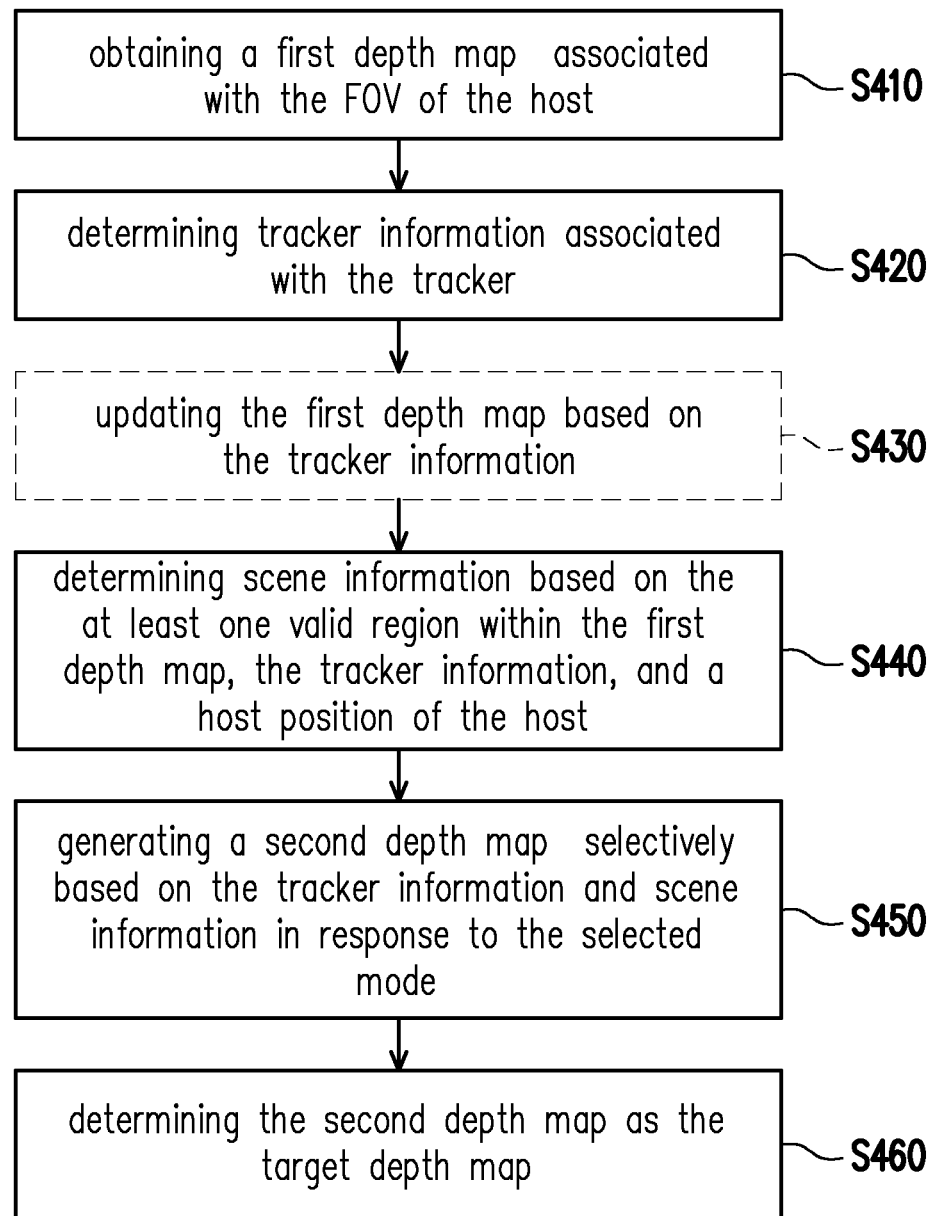
FIG. 4A shows a mechanism for determining target depth map according to a first embodiment of the disclosure.

See FIG. 4A, which shows a mechanism for determining target depth map according to a first embodiment of the disclosure.

In step S410, the processor 204 obtains a first depth map associated with the FOV of the host 200, wherein the FOV may or may not include a tracker, and the first depth map may include least one valid region. For better understanding the concept of the disclosure, FIG. 4B would be used as an example, but the disclosure is not limited thereto.

Figure 4B:
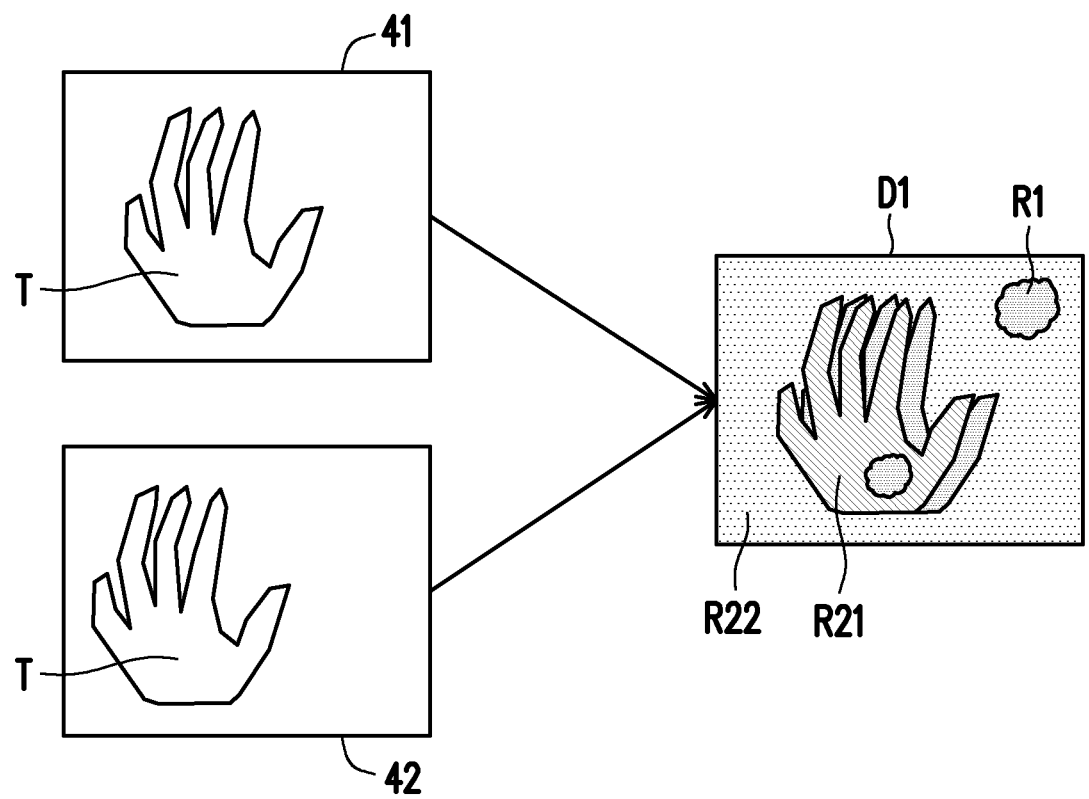
FIG. 4B shows a schematic diagram of obtaining a first depth map according to the first embodiment of the disclosure.

See FIG. 4B, which shows a schematic diagram of obtaining a first depth map according to the first embodiment of the disclosure. In FIG. 4B, it is assumed that the processor 204 obtains the first depth map D1 by using stereo cameras (which includes a left and a right stereo camera). Specifically, the processor 204 may control the left stereo camera and the right stereo camera to respectively capture images 41 and 42 associated with the FOV of the host 200.

As can be seen from the images 41 and 42, it is assumed that there is a tracker T (e.g., the user's hand) in the FOV of the host 200. In other embodiments, if there is no tracker T within the FOV of the host 200, the corresponding images 41 and 42 may not include any region corresponding to the tracker T (i.e., all regions are corresponding to the scene), but the disclosure is not limited thereto. With the images 41 and 42 in FIG. 4B, the processor 204 can determine the first depth map D1. In the embodiment where the stereo cameras are used, the processor 204 may determine the first depth map D1 based on the camera parameters associated with the stereo cameras, wherein the camera parameter may include intrinsic parameters and extrinsic parameters of the stereo camera and/or the intrinsic and extrinsic camera matrices of the stereo cameras, but the disclosure is not limited thereto.

In the first depth map D1, one or more region R1 corresponding to the tracker T and/or the scene may have invalid depth values due to, for example, occlusion, and the region(s) R1 with invalid depth values may be illustrated as black and referred to as invalid region. In addition, regions R21 and R22 may have valid depth values, wherein the region R21 corresponds to the tracker T, and the region R22 corresponds to the scene. In some embodiments, all regions in the first depth map D1 can be valid, but the disclosure is not limited thereto.

In FIG. 4B, the regions R21 and R22 may have different valid depth values, and may be illustrated with oblique lines and as dotted respectively. In the embodiment, the regions R21 and R22 can be referred to as valid regions, but the disclosure is not limited thereto.

In one embodiment, it is assumed that the first depth map D1 corresponds to a time point t. In the embodiment of the disclosure, there may exist a temporal inconsistency between the first depth map D1 and the first depth map corresponding to other time points.

Figure 4C:
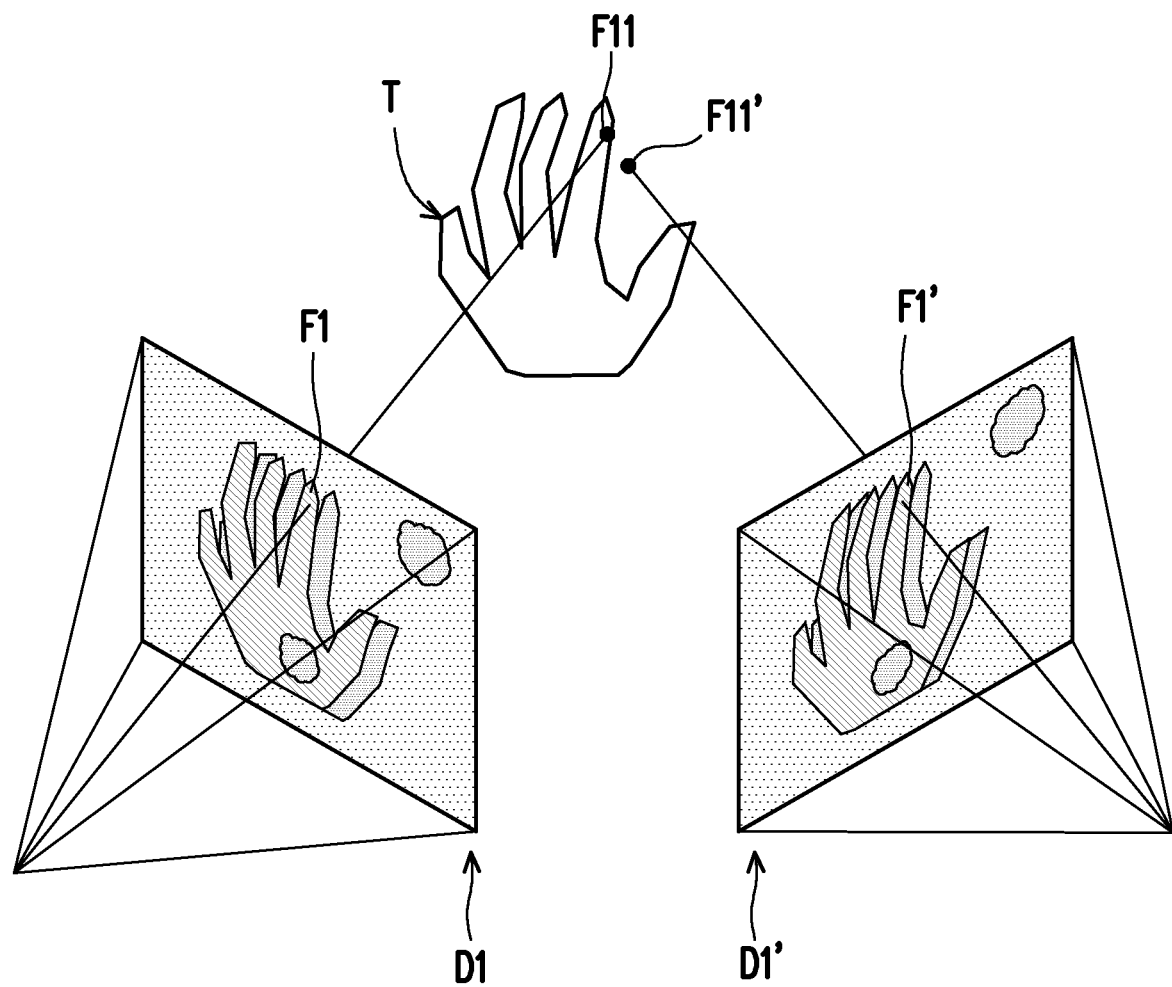
FIG. 4C shows a schematic diagram of the temporal inconsistency according to FIG. 4B.

See FIG. 4C, which shows a schematic diagram of the temporal inconsistency according to FIG. 4B. In FIG. 4C, it is assumed that the host 200 obtains another first depth map D1' corresponding to a time point t+1, but the disclosure is not limited thereto.

In the embodiment, the pixel F1 in the first depth map D1 can be reprojected (project) into the point F11 in the space (e.g., a 3D space), and the pixel F1' in the first depth map D1' can be reprojected into the point F11' in the space. As can be seen from FIG. 4C, even the pixels F1 and F1' correspond to the same position on the tracker T, the reprojected points F11 and F11' have different positions, and this is called a temporal inconsistency.

In the embodiments of the disclosure, the temporal inconsistency may be resolved by using a temporal filter, which would be discussed later.

In step S420, the processor 204 determines tracker information associated with the tracker T. In various embodiments, the tracker information associated with the tracker T may include a plurality of tracker points, wherein the plurality of tracker points may be 2D points and/or 3D points in the corresponding spaces. For better understanding the disclosure, the plurality of tracker points would be assumed to be 3D points in the following discussions, and all operations discussed in the embodiments where the tracker points are 3D points can also be applied in the embodiments where the tracker points are 2D points.

In the embodiment where the tracker T is the user's hand, the processor 204 may use the hand tracking engine to determine the 3D points on the hand skeleton of the user's hand and determine these 3D points as the tracker points (i.e., the tracker information) associated with the tracker T.

Figure 5:
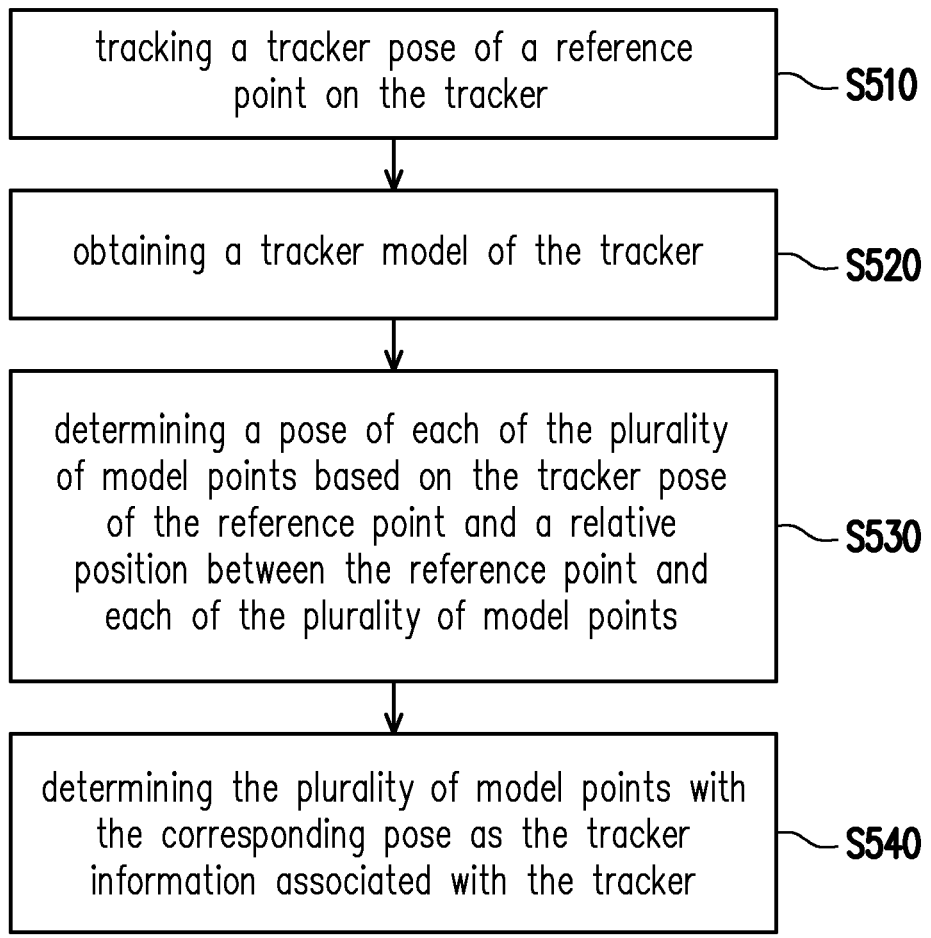
FIG. 5 shows a flow chart of determining the tracker information according to the first embodiment of the disclosure.

In the embodiment where the tracker T is an object with a fixed structure (e.g., a handheld controller and/or a wearable device), the mechanism in FIG. 5 may be used to determine the associated tracker information.

See FIG. 5, which shows a flow chart of determining the tracker information according to the first embodiment of the disclosure. In step S510, the processor 204 tracks a tracker pose of a reference point on the tracker T, wherein the reference point may be a specific point whose pose (e.g., position and orientation) can be used to characterize the pose of the tracker T, but the disclosure is not limited thereto.

In step S520, the processor 204 obtains a tracker model of the tracker T, wherein the tracker model (e.g., a 3D tracker model) may include a plurality of model points including the reference point. In the embodiment where the tracker T is the handheld controller, the tracker model may be the 3D model of the handheld controller. In the embodiment where the tracker T is a wearable device, the tracker model may be the 3D model of the wearable device, but the disclosure is not limited thereto.

In the embodiment, the tracker model can be understood as recording the relative position between the reference point and each model points, but the disclosure is not limited thereto.

In step S530, the processor 204 determines a pose of each of the plurality of model points based on the tracker pose of the reference point and a relative position between the reference point and each of the plurality of model points. For example, if the model points include a certain point that is distant from the reference point by a specific distance on a specific direction, the processor 204 may derive the pose of the certain point based on the tracker pose of the reference point and the relative position between the reference point and the certain point, but the disclosure is not limited thereto.

In step S540, the processor 204 determines the plurality of model points with the corresponding pose as the tracker information associated with the tracker T.

Referring back to FIG. 4A, in step S430, the processor 204 updates the first depth map D1 based on the tracker information.

Figure 6:
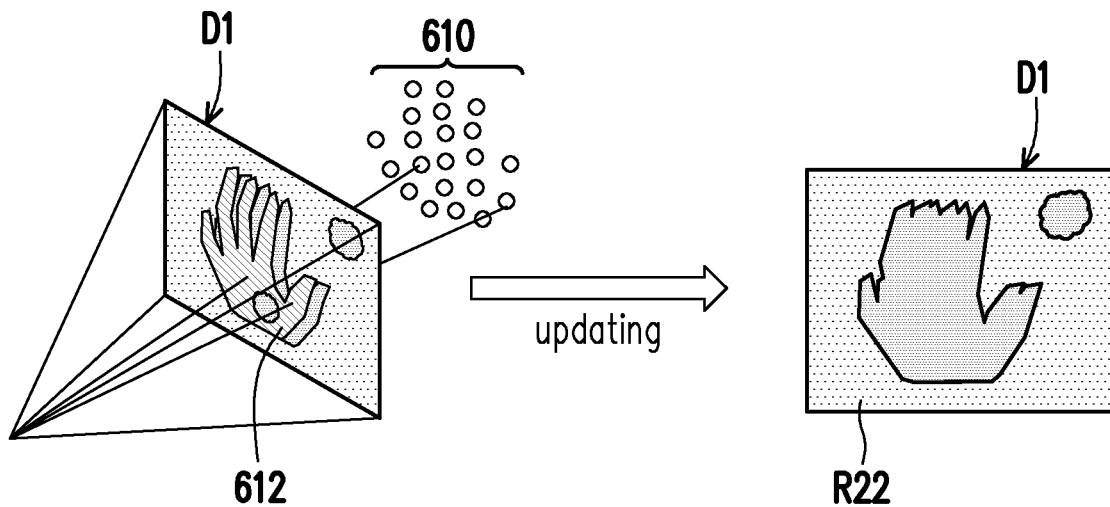
FIG. 6 shows a schematic diagram of updating the first depth map according to the first embodiment of the disclosure.

See FIG. 6, which shows a schematic diagram of updating the first depth map according to the first embodiment of the disclosure. In the embodiment, the tracker information associated with the tracker T may be characterized by the tracker points 610, but the disclosure is not limited thereto. In FIG. 6, after determining the tracker points 610 associated with the tracker T, the processor 204 may determine a tracker region 612 within the first depth map D1 via projecting the tracker points 610 onto the first depth map D1.

In one embodiment, the processor 204 may project the tracker points 610 onto the first depth map D1 based on the camera parameter (e.g., intrinsic parameters and extrinsic parameters and/or the intrinsic and extrinsic camera matrices) mentioned in the above, but the disclosure is not limited thereto.

Next, the processor 204 may update the first depth map D1 via setting the tracker region 612 as invalid. In one embodiment, the processor 204 may set the depth values within the tracker region 612 to be invalid to update the first depth map D1.

In FIG. 6, it is assumed that the tracker region 612 corresponds to the region R21 (e.g., one of the valid regions in the first depth map D1) in FIG. 4B. In this case, the processor 204 can be understood as setting the valid depth values in the region R21 to be invalid, such that the region R21 in the updated first depth map D1 is illustrated as black, but the disclosure is not limited thereto.

From another perspective, after the first depth map D1 has been updated in FIG. 6, the remaining valid region in the first depth map D1 can be understood as the region R22, but the disclosure is not limited thereto.

Referring back to FIG. 4A, in step S440, the processor 204 determines scene information based on the at least one valid region within the first depth map D1, the tracker information, and a host position of the host 200.

In different embodiments, after performing step S420, the processor 204 may firstly perform step S430 and then perform step S440, or directly perform step S440 without performing step S430. That is, the first depth map D1 considered in step S440 may be the first depth map D1 determined in step S410 or the first depth map D1 updated in step S430. For better understanding, the first depth map D1 considered in the following would be assumed to be the first depth map D1 updated in step S430, but the disclosure is not limited thereto.

In various embodiments, the scene information may include a plurality of scene points, wherein the plurality of scene points may be 2D points and/or 3D points in the corresponding spaces. For better understanding the disclosure, the plurality of scene points would be assumed to be 3D points in the following discussions, and all operations discussed in the embodiments where the scene points are 3D points can also be applied in the embodiments where the scene points are 2D points.

Figure 7:
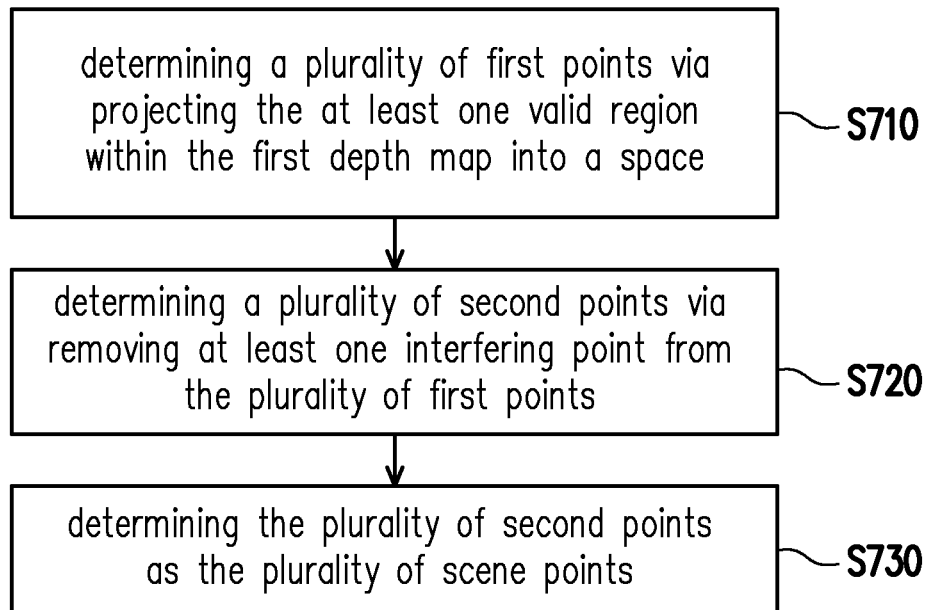
FIG. 7 shows a flow chart of determining scene information according to the first embodiment of the disclosure.
Figure 8:
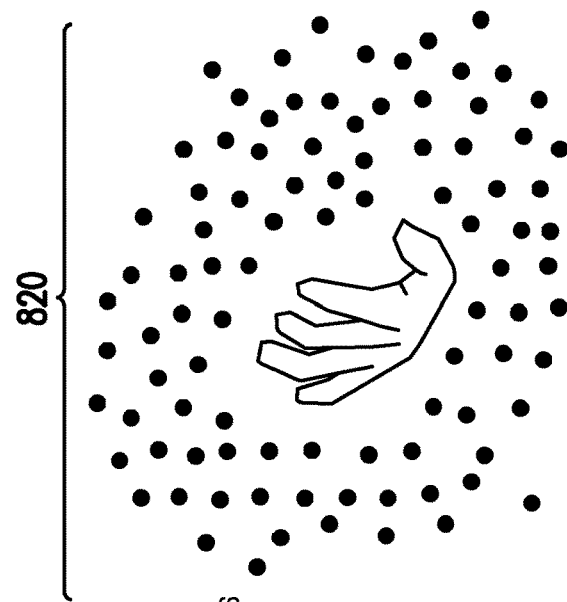
FIG. 8 shows a schematic diagram of obtaining the scene information according to FIG. 6 and FIG. 7.
Figure 8:
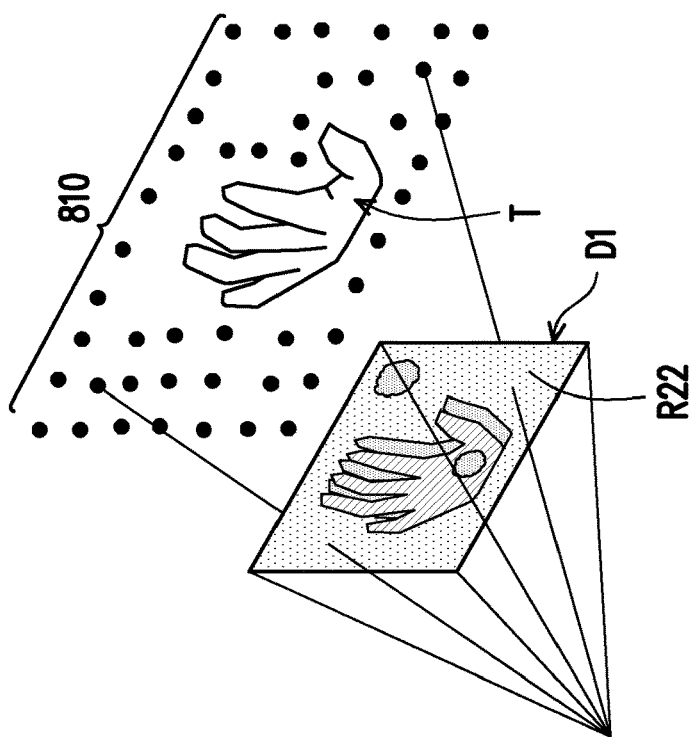

For better understanding the concept of the disclosure, FIG. 7 and FIG. 8 would be used as examples, wherein FIG. 7 shows a flow chart of determining scene information according to the first embodiment of the disclosure, and FIG. 8 shows a schematic diagram of obtaining the scene information according to FIG. 6 and FIG. 7.

In step S710, the processor 204 determines a plurality of first points via projecting the at least one valid region within the first depth map D1 into a space (e.g. reproject into a 3D space, but the disclosure is not limited thereto).

In one embodiment, since the projecting in step S710 can be understood as involving projecting 2D points into 3D space, this projecting can be also interpreted as an reprojecting to people having ordinary skills in the art. For the terms "projecting" mentioned in other descriptions of the disclosure, similar principle can be used for interpretation, but the disclosure is not limited thereto.

In the scenario of FIG. 8, since the remaining valid region in the updated first depth map D1 is assumed to be the region R22, the processor 204 may project (e.g., reproject) (the pixels in) the region R22 into the space to obtain the first points 810.

In step S720, the processor 204 determines a plurality of second points via removing a interfering point(s) from the plurality of first points 810. In one embodiment, the interfering points can be understood as the first points that is too close to the tracker points, the tracker T, and/or the host 200, but the disclosure is not limited thereto. From another perspective, a first distance between each of the at least one interfering point and any of the plurality of tracker points is less than a distance threshold, and a second distance between each of the at least one interfering point and any of the host position is less than the distance threshold.

In the embodiment, the distance threshold may depend on the selected mode. In one embodiment, the distance threshold corresponding to the first mode may be smaller than the distance threshold corresponding to the second mode, but the disclosure is not limited thereto.

In some embodiments, the interfering points can be determined based on other information, such as the pose of the tracker T and/or the pose of the host 200, but the disclosure is not limited thereto.

In some embodiments, the processor 204 may determine the host position of the host 200 by using tracking mechanisms such as inside-out and/or outside-in tracking mechanisms, but the disclosure is not limited thereto.

In some embodiments where there are no interfering points (e.g., all of the plurality of the first points 810 are far away from the host 200 and/or the tracker T), the plurality of second points can also be determined without removing the interfering points from the plurality of first points 810, but the disclosure is not limited thereto.

In step S730, the processor 204 determines the plurality of second points as the plurality of scene points 820.

In one embodiment, before determining the plurality of second points as the plurality of scene points 820, the processor 204 may add a plurality of historical scene points into the plurality of second points.

In the embodiment where the first depth map D1 is assumed to correspond to the time point t, the scene points 820 can be understood as corresponding to the time point t as well. In this case, the historical scene points may be the scene points corresponding to the time point t-k, wherein t and k may be positive integers.

That is, the processor 204 may copy some of the scene points corresponding to the time point t-k as a part of the second points corresponding to the time point t, but the disclosure is not limited thereto.

Additionally or alternatively, before determining the plurality of second points as the plurality of scene points 820, the processor 204 may further apply a temporal filter to the plurality of second points to resolve the temporal inconsistency, but the disclosure is not limited thereto.

Referring back to FIG. 4A, in step S450, the processor 204 generates a second depth map selectively based on the tracker information and scene information in response to the selected mode.

Figure 9:
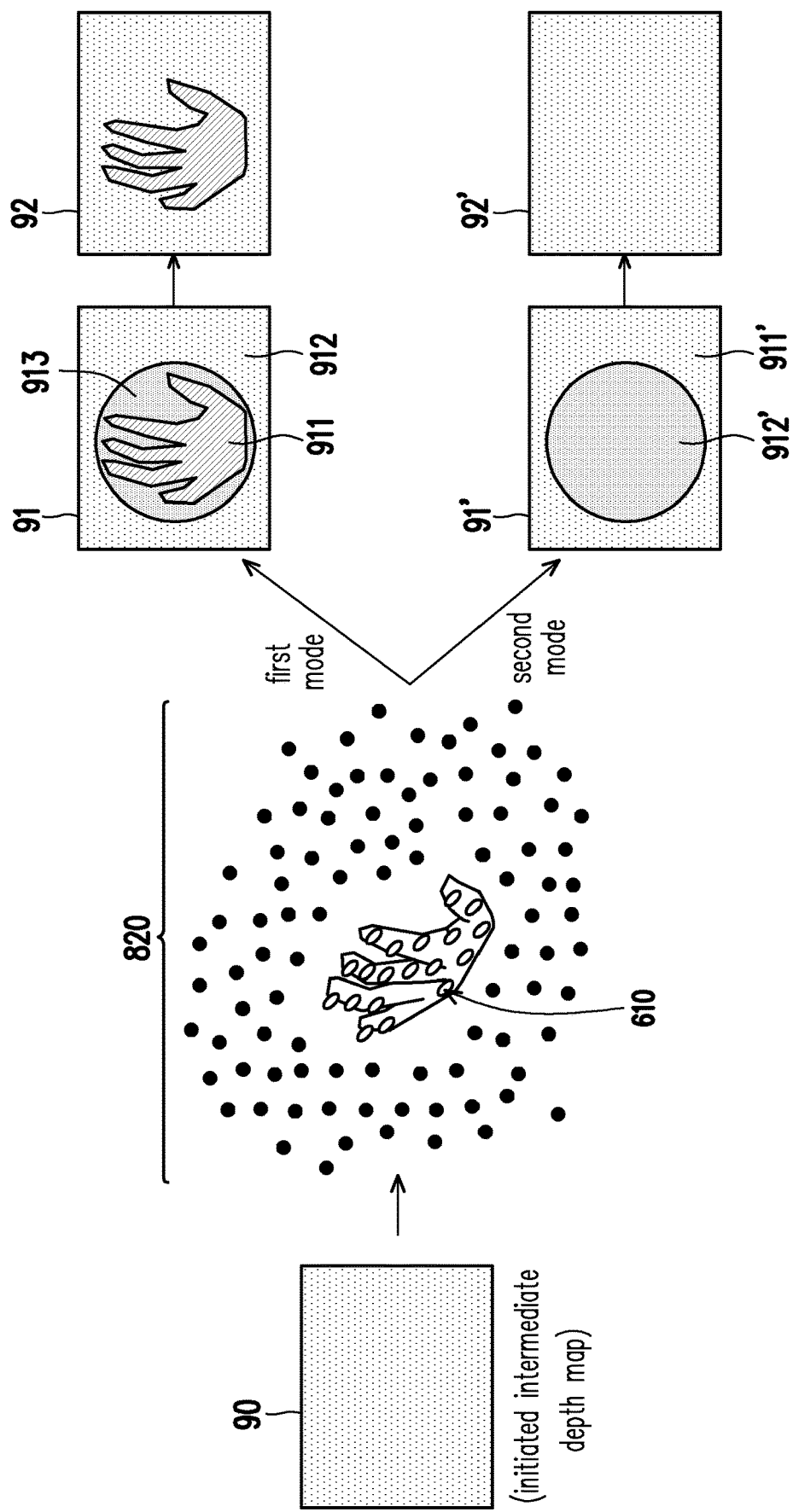
FIG. 9 shows a schematic diagram of generating the second depth map according to the first embodiment of the disclosure.

See FIG. 9, which shows a schematic diagram of generating the second depth map according to the first embodiment of the disclosure.

In FIG. 9, the processor 204 may initiate an intermediate depth map 90. In one embodiment, the processor 204 may initiate the intermediate depth map 90 by copying a part of a historical depth map as the initiated intermediate depth map 90, wherein the part of the historical depth map includes at least one depth point, and a depth of each of the at least one depth point is larger than a depth threshold. That is, the processor 204 may copy the part in the historical depth map that is farther than the depth threshold as the initiated intermediate depth map 90, but the disclosure is not limited thereto.

In one embodiment, the historical depth map may be the second depth map corresponding to a historical time point, such as the second depth map corresponding to the time point t-k' (k' is a positive integer), but the disclosure is not limited thereto.

In another embodiment, the initiated intermediate depth map 90 can be determined by other information, such as historical scene information, but the disclosure is not limited thereto.

In another embodiment, the part being copied from the historical depth map can be determined in other ways. For example, the processor 204 can determine a particular region not corresponding to the tracker T in the historical depth map as the part being copied from the historical depth map, but the disclosure is not limited thereto.

Next, in response to determining that the selected mode is the first mode, the processor 204 may update the intermediate depth map 90 via projecting the plurality of tracker points 610 and the plurality of scene points 820 to a reference position.

In different embodiments, the reference position may include, but not limited to, at least one of to a center of user eyes, a center of displays of the host 200, a focus of each of the user eyes and a focus of each of the displays of the host 200.

In the embodiment, the processor 204 may perform the above projection based on, for example, the camara parameter mentioned in the above, which would not be repeated herein.

As can be seen from FIG. 9, the updated intermediate depth map 91 corresponding to the first mode may exemplarily include regions 911 to 913, wherein the region 911 may be a valid region corresponding to the tracker points 610, the region 912 may be a valid region corresponding to the scene points 820, and the region 913 may be an invalid region between the regions 911 and 912.

In this case, the processor 204 may determine the corresponding second depth map 92 via smoothing the intermediate depth map 91. In different embodiments, the smoothing performed by the processor 204 may involve, for example, some hole filling operations and interpolation operations, but the disclosure is not limited thereto.

As can be seen from FIG. 9, the region 913 (e.g., the invalid region) has been smoothed out, and hence the region 913 does not exist in the second depth map 92, but the disclosure is not limited thereto.

In another embodiment, in response to determining that the selected mode is the second mode, the processor 204 may update the intermediate depth map 90 via projecting the plurality of scene points 820 to the reference position. That is, when the selected mode is the second mode, the plurality of tracker points 610 would not be projected to the reference position in the process of updating the intermediate depth map 90, but the disclosure is not limited thereto.

As can be seen from FIG. 9, the updated intermediate depth map 91' corresponding to the second mode may exemplarily include regions 911' and 912', wherein the region 911' may be a valid region corresponding to the scene points 820, and the region 912' may be an invalid region.

In this case, the processor 204 may determine the corresponding second depth map 92' via smoothing the intermediate depth map 91'. In different embodiments, the smoothing performed by the processor 204 may involve, for example, some hole filling operations and interpolation operations, but the disclosure is not limited thereto.

As can be seen from FIG. 9, the region 912' (e.g., the invalid region) has been smoothed out, and hence the region 912' does not exist in the second depth map 92', but the disclosure is not limited thereto.

Noted that although the intermediate depth map 90 and the second depth map 92' in FIG. 9 are illustrated with the same pattern, the content in the intermediate depth map 90 should be different from the content in the second depth map 92'.

Referring back to FIG. 4A, in step S460, the processor 204 determines the second depth map as the target depth map. In the embodiments of the disclosure, the second depth map considered in step S460 and the following discussions may be the second depth map 92 if the selected mode is the first mode or the second depth map 92' if the selected mode is the second mode.

In one embodiment, after determining the target depth map, the processor 204 may subsequently perform step S320 in FIG. 3.

In step S320, the processor 204 renders a pass-through view based on an image associated with the FOV of the host 200, the camera parameter, and the target depth map, wherein the target depth map can be the second depth map 92 or the second depth map 92' depending on the selected mode.

In one embodiment, the image associated with the FOV may be the image captured by the RGB camera of the host 200, but the disclosure is not limited thereto.

In one embodiment, the processor 204 may warp the image associated with the FOV into the pass-through view based on the camera parameter and the target depth map, and the associated details may be referred to the document of image warping, but the disclosure is not limited thereto.

In one embodiment, the processor 204 may render a virtual object of the tracker T based on the plurality of tracker points or the tracker model and overlay the virtual object onto the pass-through view, or overlay the pass-through view onto the virtual object. In another embodiment, the processor 204 may merely render the pass-through view without rendering the virtual object, but the disclosure is not limited thereto.

In the embodiments of the disclosure, whether to further render the virtual object of the tracker T can be determined based on the requirements of the designer/content developer/user regardless the selected mode. If it is determined to render the virtual object, the virtual object can be rendered based on the tracker points and/or the tracker model, but the disclosure is not limited thereto.

In the embodiments where the selected mode is the first mode, since the second depth map 92 used for performing the image warping has been better determined, the position/scale of the tracker T in the pass-through view can be more accurate. In this case, the user can interact with the visual content more accurately despite of the distortion in the pass-through view. From another perspective, if the developer needs the user to interact with the visual content while experiencing the MR service, the developer may choose the first mode as the selected mode.

In the embodiments where the selected mode is the second mode, since the second depth map 92' can be understood as involving least tracker information and/or close object information, the distortion in the pass-through view can be mitigated, which provides a better visual quality. From another perspective, if the developer does not need the user to interact with the visual content while experiencing the MR service, the developer may choose the second mode as the selected mode. In this case, the processor 204 can even not display the virtual object of the tracker T in the visual content, so that the user may not be affected by the wrongly rendered pass-through view.

Figure 10A:
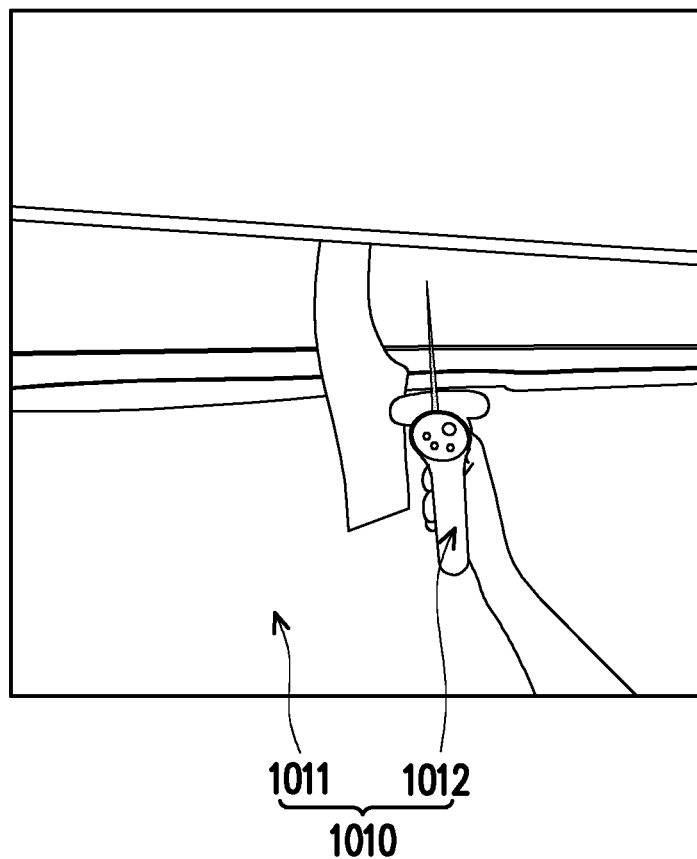
FIG. 10A shows an application scenario where the selected mode is the first mode according to an embodiment of the disclosure.

See FIG. 10A, which shows an application scenario where the selected mode is the first mode according to an embodiment of the disclosure.

In FIG. 10A, the visual content 1010 may be an MR content, which may include the pass-through view 1011 and the virtual object 1012, wherein the pass-through view 1011 may show the real world scene in front of the user, and the virtual object 1012 may be a virtual model rendered based on, for example, the corresponding 3D tracker points of the considered tracker (e.g., the handheld controller). In some embodiments, the rendering of the virtual object 1012 can be omitted, but the disclosure is not limited thereto.

As can be seen from FIG. 10A, despite of the distortion in the pass-through view 1011, the scale/position of the tracker in the pass-through view is accurate, which makes the virtual object 1012 align with the tracker (e.g., the handheld controller) in the pass-through view 1011.

Therefore, when the user needs to interact with the MR content, the user would not be confused about which of the tracker and the virtual object 1012 that the user should refer to, such that the user can accurately interact with the MR content, and hence the user experience can be guaranteed.

Figure 10B:
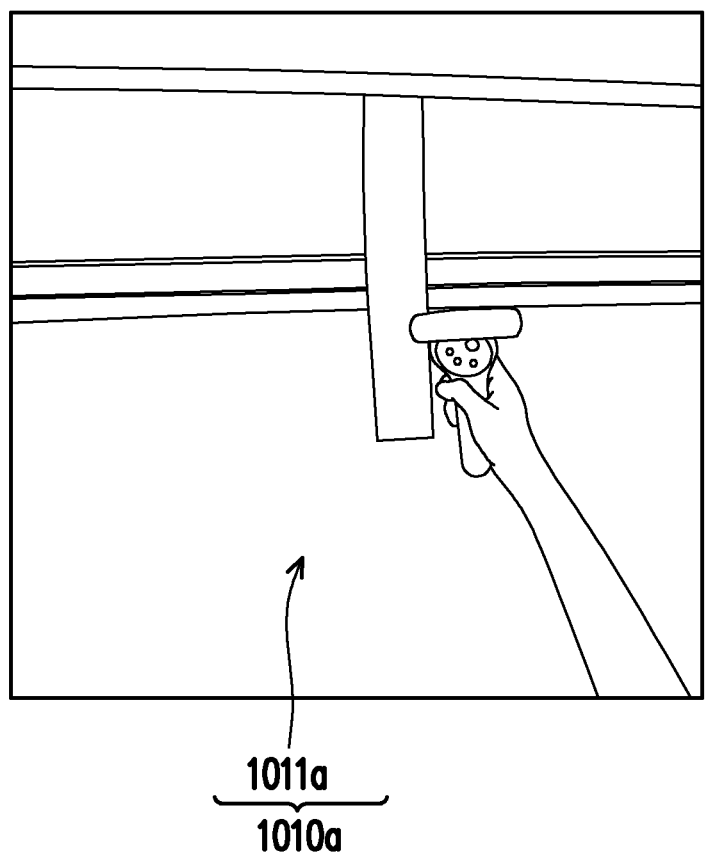
FIG. 10B shows an application scenario where the selected mode is the second mode according to an embodiment of the disclosure.

See FIG. 10B, which shows an application scenario where the selected mode is the second mode according to an embodiment of the disclosure.

In FIG. 10B, the visual content 1010a may be an MR content, which may include the pass-through view 1011a, wherein the pass-through view 1011a may show the real world scene in front of the user. In the embodiment, since no virtual object corresponding to the considered tracker (e.g., the handheld controller) is shown in the MR content and no distortion exists in the pass-through view 1011a, the user can have a better visual experience in the cases where the user does not need to interact with the MR content.

Figure 11:
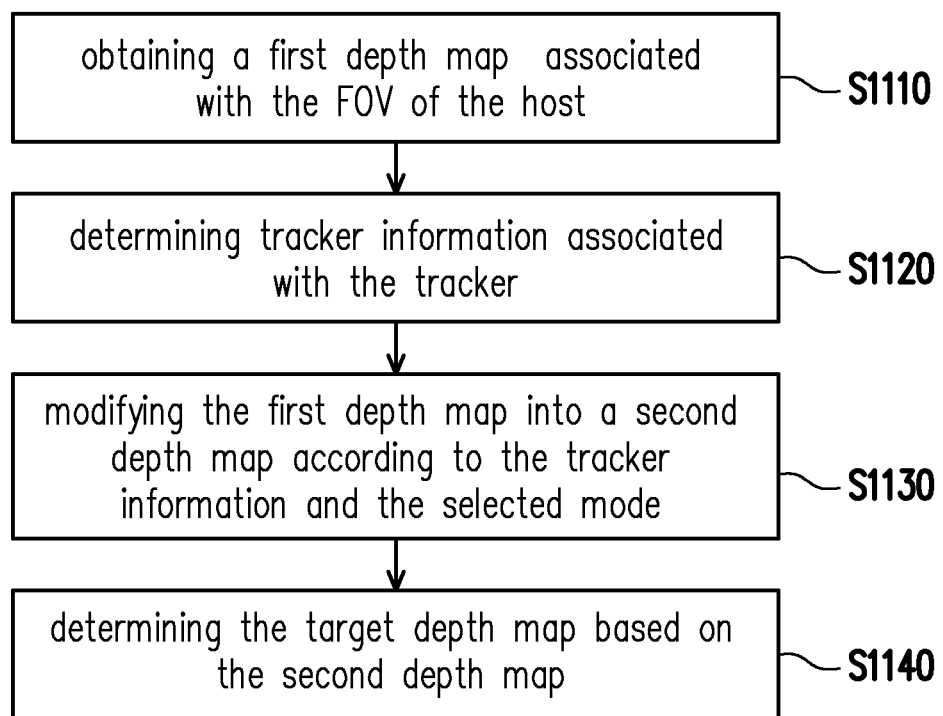
FIG. 11 shows a mechanism for determining target depth map according to a second embodiment of the disclosure.

See FIG. 11, which shows a mechanism for determining target depth map according to a second embodiment of the disclosure.

In step S1110, the processor 204 obtains a first depth map associated with the FOV of the host 200. In step S1120, the processor 204 determines tracker information associated with the tracker T. In the embodiments of the disclosure, details of steps S1110 and S1120 can be referred to the associated descriptions in the first embodiment, which would not be repeated herein.

In step S1130, the processor 204 modifies the first depth map into a second depth map according to the tracker information and the selected mode. In one embodiment, step S1130 can be implemented by using the mechanism in FIG. 12.

Figure 12:
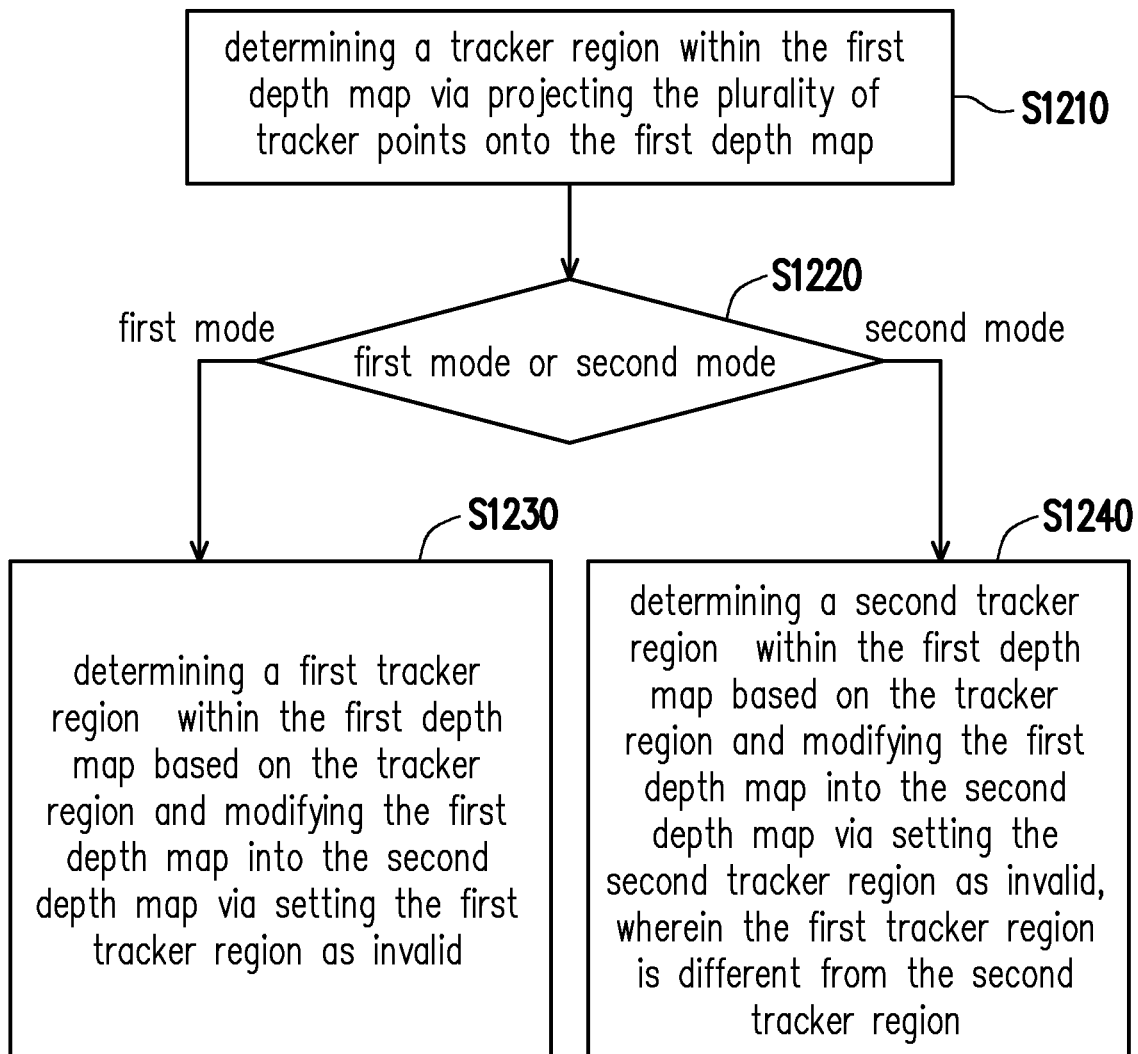
FIG. 12 shows the mechanism of modifying the first depth map into the second depth map according to the second embodiment of the disclosure.

See FIG. 12, which shows the mechanism of modifying the first depth map into the second depth map according to the second embodiment of the disclosure. For better understanding the disclosure, FIG. 13 would be used as an example, wherein FIG. 13 shows a schematic diagram according to FIG. 12.

Figure 13:
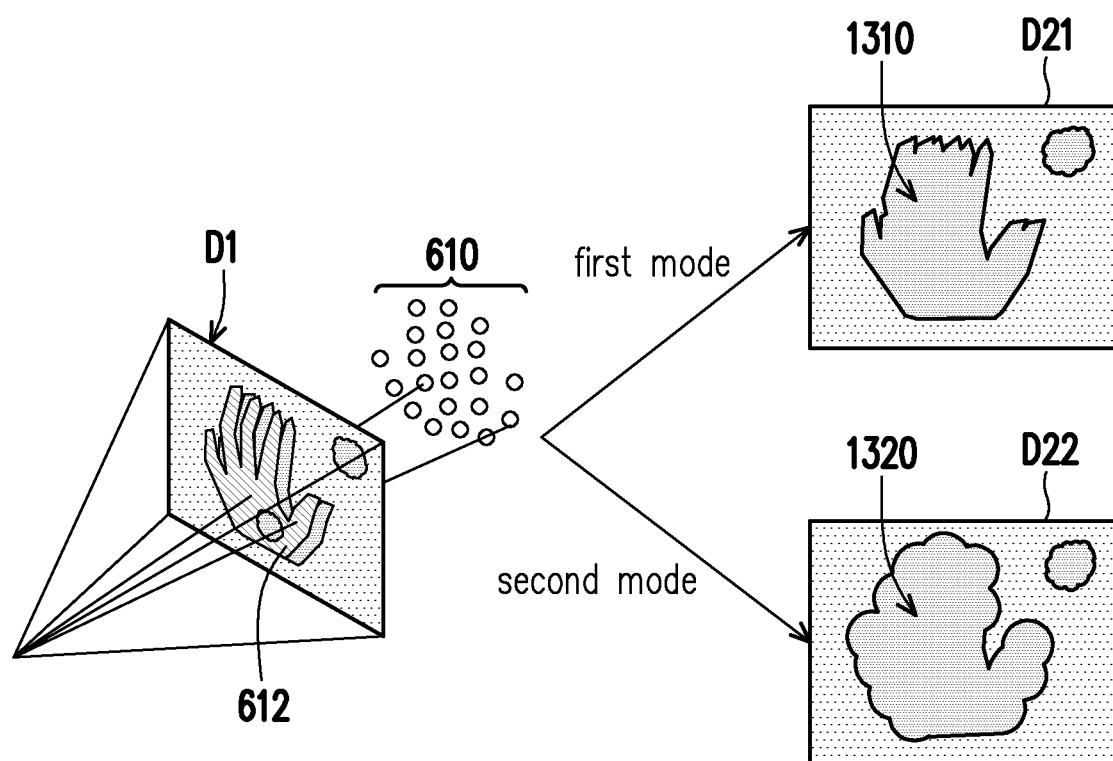
FIG. 13 shows a schematic diagram according to FIG. 12.

In FIG. 13, it is assumed that the first depth map D1 obtained in step S1110 is the first depth map D1 on the right side of FIG. 6 and the tracker information includes the tracker points 610 in FIG. 6, but the disclosure is not limited thereto.

In step S1210, the processor 204 determines a tracker region 612 within the first depth map D1 via projecting the plurality of tracker points 610 onto the first depth map D1, and the associated details can be referred to the descriptions of FIG. 6, which would not be repeated herein.

In step S1220, the processor 204 determines whether the selected mode is the first mode or the second mode. In one embodiment, in response to determining that the selected mode is the first mode, the processor 204 may proceed to step S1230. In another embodiment, in response to determining that the selected mode is the second mode, the processor 204 may proceed to step S1240.

In step S1230, the processor 204 determines a first tracker region 1310 within the first depth map D1 based on the tracker region 612 and modifies the first depth map D1 into the second depth map D21 via setting the first tracker region 1310 as invalid. In FIG. 13, the first tracker region 1310 can be assumed to the same as the tracker region 612, but the disclosure is not limited thereto.

In step S1240, the processor 204 determines a second tracker region 1320 within the first depth map D1 based on the tracker region 612 and modifies the first depth map D1 into the second depth map D22 via setting the second tracker region 1320 as invalid.

In some embodiments, wherein the first tracker region 1310 may be different from the second tracker region 1320.

In the scenario of FIG. 13, the first tracker region 1310 can be smaller than the second tracker region 1320, but the disclosure is not limited thereto. That is, in FIG. 13, more pixels in the first depth map D1 would be set as invalid when the selected mode is the second mode, but the disclosure is not limited thereto.

Referring back to FIG. 11, in step S1140, the processor 204 determines the target depth map based on the second depth map. In different embodiments, the second depth map considered in step S1140 can be the second depth map D21 if the selected mode is the first mode or the second depth map D22 if the selected mode is the second mode, but the disclosure is not limited thereto.

Figure 14:
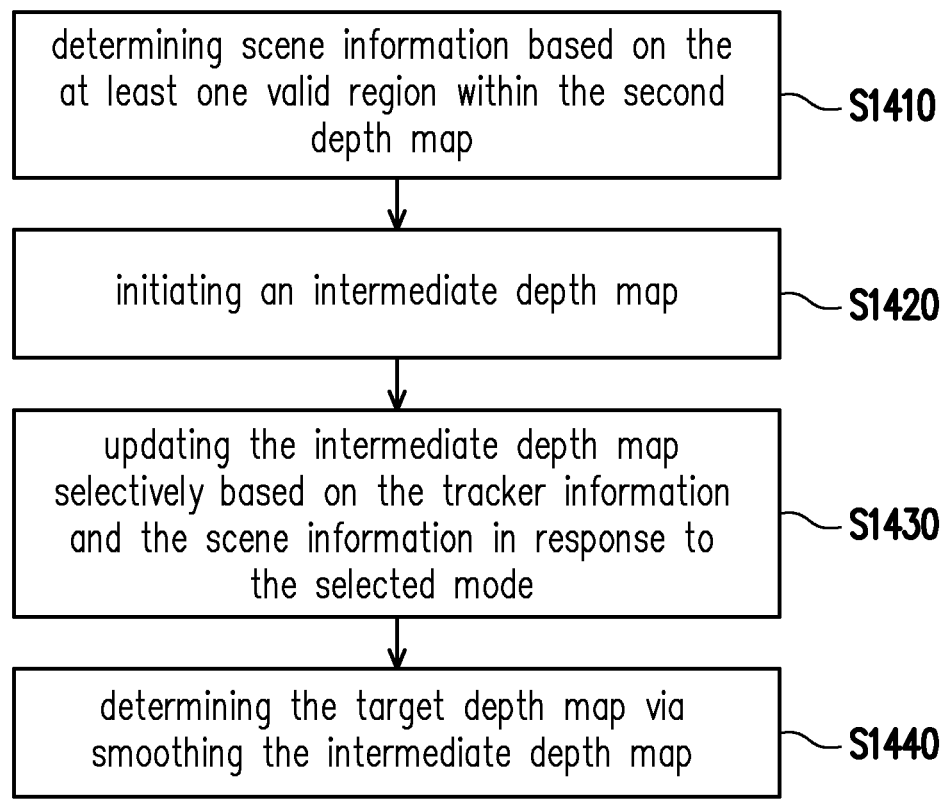
FIG. 14 shows the mechanism of determining the target depth map based on the second depth map according to the first variant of the second embodiment of the disclosure.

In a first variant of the second embodiment, step S1140 can be implemented by using the mechanism in FIG. 14.

Figure 15:
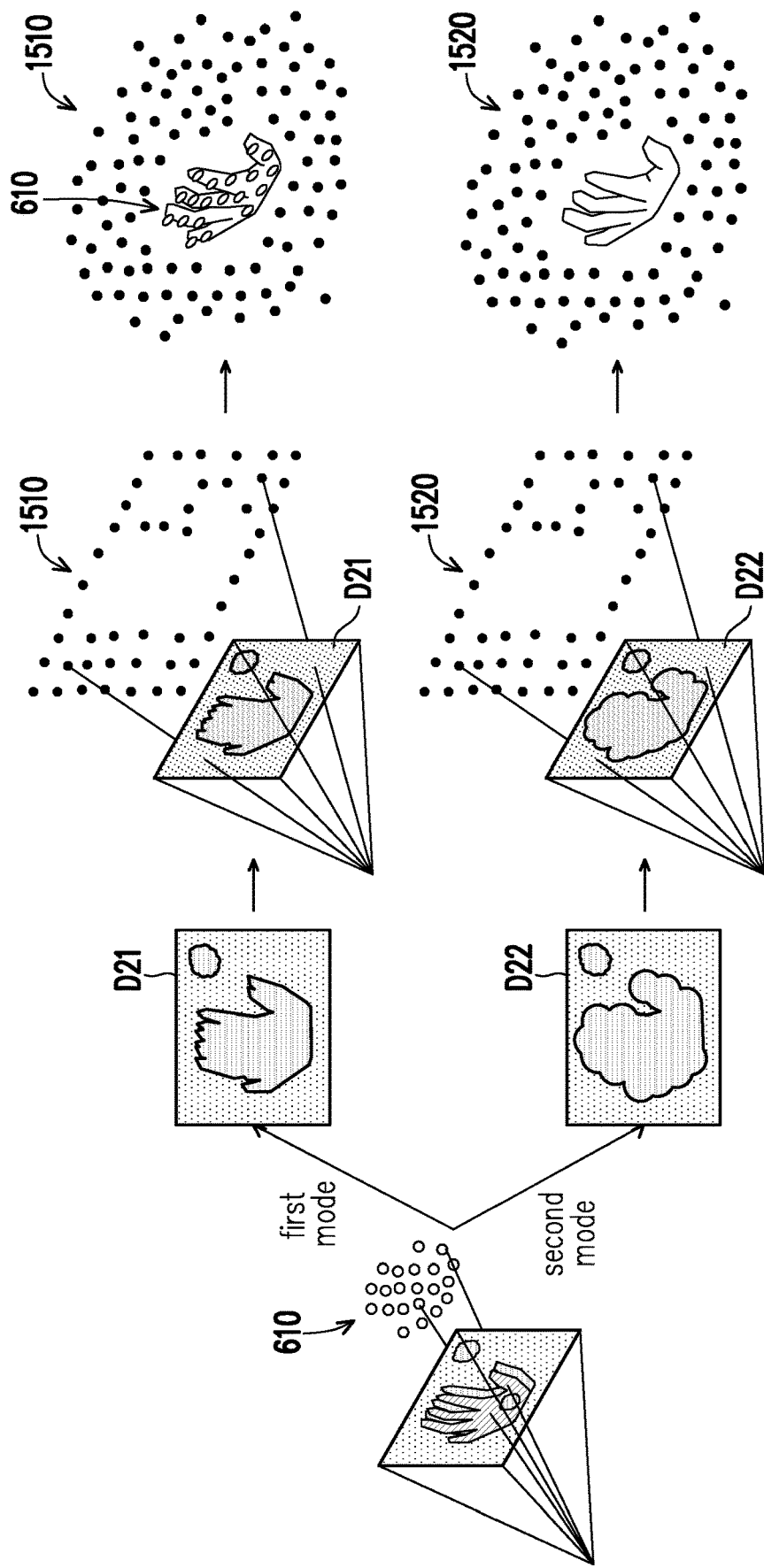
FIG. 15 shows a schematic diagram according to FIG. 14.

See FIG. 14, which shows the mechanism of determining the target depth map based on the second depth map according to the first variant of the second embodiment of the disclosure. For better understanding the disclosure, FIG. 15 would be used as an example, wherein FIG. 15 shows a schematic diagram according to FIG. 14.

In step S1410, the processor 204 determines scene information based on the at least one valid region within the second depth map.

In the embodiment where the selected mode is the first mode, the second depth map considered in step S1410 can be the second depth map D21. In this case, the processor 204 may project the valid region in the second depth map D21 into the space (e.g., reproject into the 3D space) to obtain the scene points 1510 as the corresponding scene information.

In another embodiment where the selected mode is the second mode, the second depth map considered in step S1410 can be the second depth map D22. In this case, the processor 204 may project the valid region in the second depth map D22 into the space (e.g., reproject into the 3D space) to obtain the scene points 1520 as the corresponding scene information, but the disclosure is not limited thereto.

In step S1420, the processor 204 may initiating an intermediate depth map, and the associated details may be referred to the above embodiments. For better understanding, the initiated intermediate depth map can be assumed to be the intermediate depth map 90 in FIG. 9, but the disclosure is not limited thereto.

In step S1430, the processor 204 updates the intermediate depth map 90 selectively based on the tracker information and the scene information in response to the selected mode.

In the embodiment where the selected mode is the first mode, the processor 204 may update the intermediate depth map 90 via projecting the plurality of tracker points 610 and the plurality of scene points 1510 to the reference position. For better understanding, the corresponding updated intermediate depth map can be assumed to be the updated intermediate depth map 91 in FIG. 9, but the disclosure is not limited thereto.

In the embodiment where the selected mode is the second mode, the processor 204 may update the intermediate depth map 90 via projecting the plurality of scene points 1520 to the reference position. For better understanding, the corresponding updated intermediate depth map can be assumed to be the updated intermediate depth map 91' in FIG. 9, but the disclosure is not limited thereto.

In step S1440, the processor 204 determines the target depth map via smoothing the intermediate depth map.

In the embodiment where the selected mode is the first mode, since the corresponding updated intermediate depth map is assumed to be the updated intermediate depth map 91 in FIG. 9, the processor 204 may smooth the intermediate depth map 91 to determine the corresponding target depth map in step S1440. For better understanding the corresponding target depth map may be assumed to be the second depth map 92 in FIG. 9, but the disclosure is not limited thereto.

In the embodiment where the selected mode is the second mode, since the corresponding updated intermediate depth map is assumed to be the updated intermediate depth map 92 in FIG. 9, the processor 204 may smooth the intermediate depth map 92 to determine the corresponding target depth map in step S1440. For better understanding the corresponding target depth map may be assumed to be the second depth map 92' in FIG. 9, but the disclosure is not limited thereto.

Figure 16:
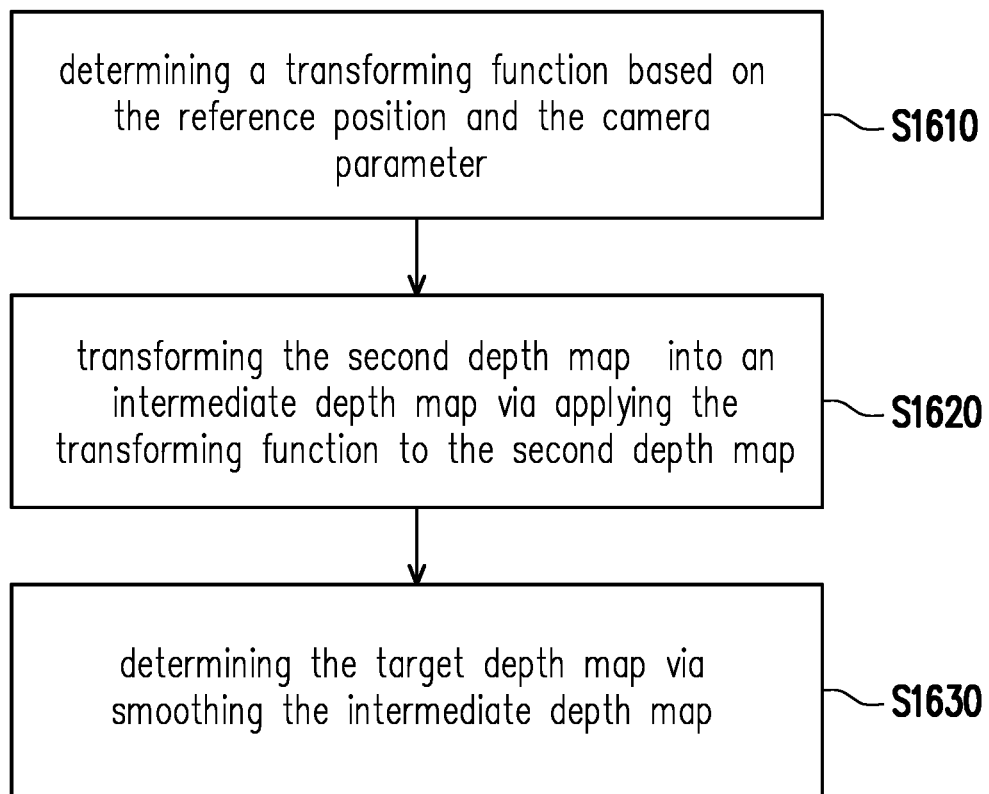
FIG. 16 shows the mechanism of determining the target depth map based on the second depth map according to the second variant of the second embodiment of the disclosure.

In a second variant of the second embodiment, step S1140 can be implemented by using the mechanism in FIG. 16.

Figure 17:
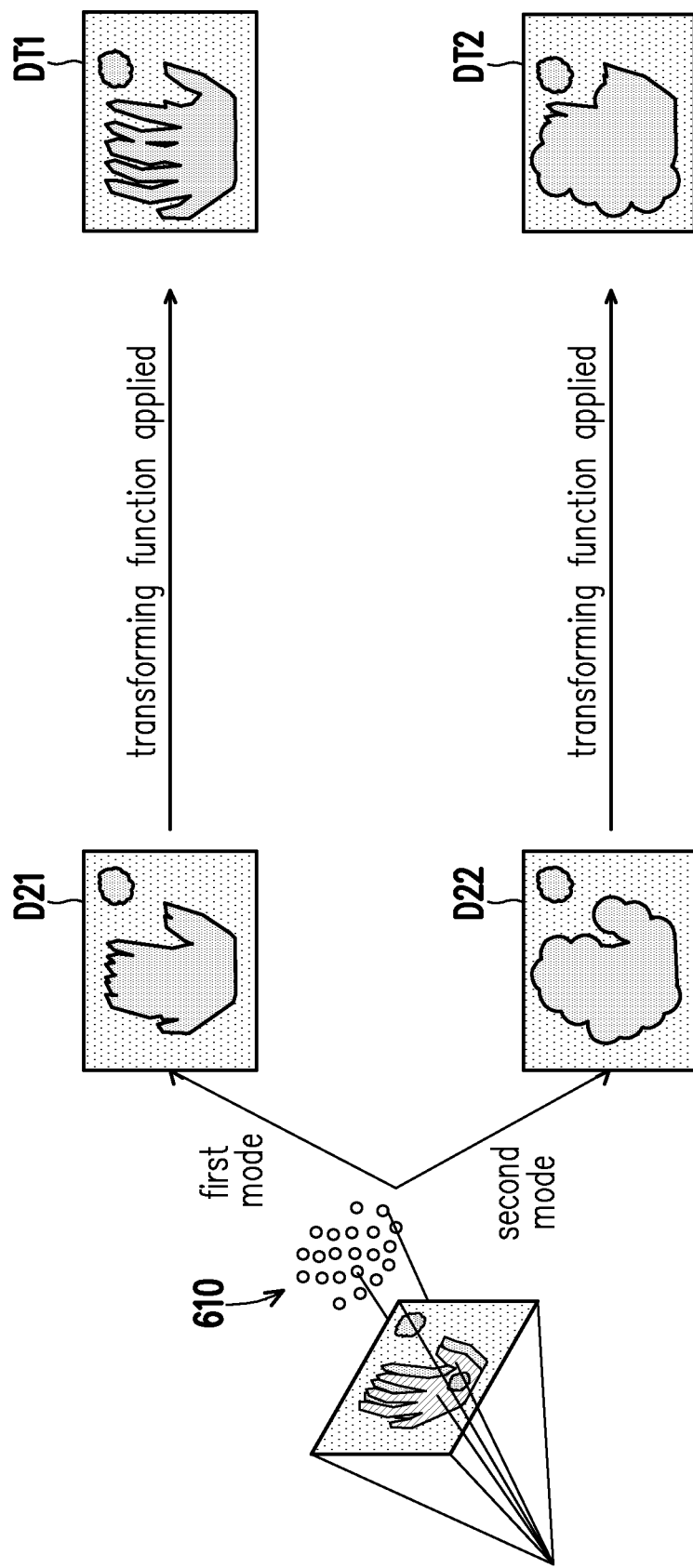
FIG. 17 shows a schematic diagram according to FIG. 16.

See FIG. 16, which shows the mechanism of determining the target depth map based on the second depth map according to the second variant of the second embodiment of the disclosure. For better understanding the disclosure, FIG. 17 would be used as an example, wherein FIG. 17 shows a schematic diagram according to FIG. 16.

In step S1610, the processor 204 determines a transforming function based on the reference position and the camera parameter. In step S1620, the processor 204 transforms the second depth map into an intermediate depth map via applying the transforming function to the second depth map.

In the embodiment where the selected mode is the first mode, the second depth map considered in steps S1620 can be the second depth map D21. In this case, the processor 204 may transform the second depth map D21 into the corresponding intermediate depth map DT1 via applying the transforming function to the second depth map D21.

In another embodiment where the selected mode is the second mode, the second depth map considered in step S1620 can be the second depth map D22. In this case, the processor 204 may transform the second depth map D22 into the corresponding intermediate depth map DT2 via applying the transforming function to the second depth map D22.

In some embodiments, the transforming function may be represented by $P(\cdot)$ and determined by the camera parameters (e.g., the intrinsic parameters and extrinsic parameters mentioned in the above) and the reference position (e.g., the center of user eyes) such that $(u', v')=P(u, v, d)$, wherein u, v represent the coordinate in the to-be-transformed second depth map, u', v' represent the coordinate in the corresponding target depth map, and d is the depth value of the coordinate $(u, v)$ in the considered second depth map.

That is, the processor 204 may directly apply the transforming function to the considered second depth map to obtain the corresponding intermediate depth map, wherein the transforming function may be a particular function predetermined based on the camera parameters and the reference position, but the disclosure is not limited thereto.

After determining the corresponding intermediate depth map in step S1620, the processor 204 may determine the target depth map via smoothing the intermediate depth map in step S1630. In different embodiments, the smoothing performed by the processor 204 may involve, for example, some hole filling operations and interpolation operations, but the disclosure is not limited thereto. The details of step S1630 can be referred to the above embodiments, which would not be repeated herein.

In the first and/or second variant of the second embodiment, after obtaining the target depth map, the processor 204 may proceed to step S320 in FIG. 3 to accordingly determine the pass-through view.

In this case, when the pass-through view is rendered in the embodiments where the selected mode is the first mode, the scale/position of the tracker in the pass-through view would be accurate, such that the user can accurately interact with the corresponding MR content. On the other hand, when the pass-through view is rendered in the embodiments where the selected mode is the second mode, no distortion would exist in the pass-through view, such that the user can have a better visual experience.

Figure 18:
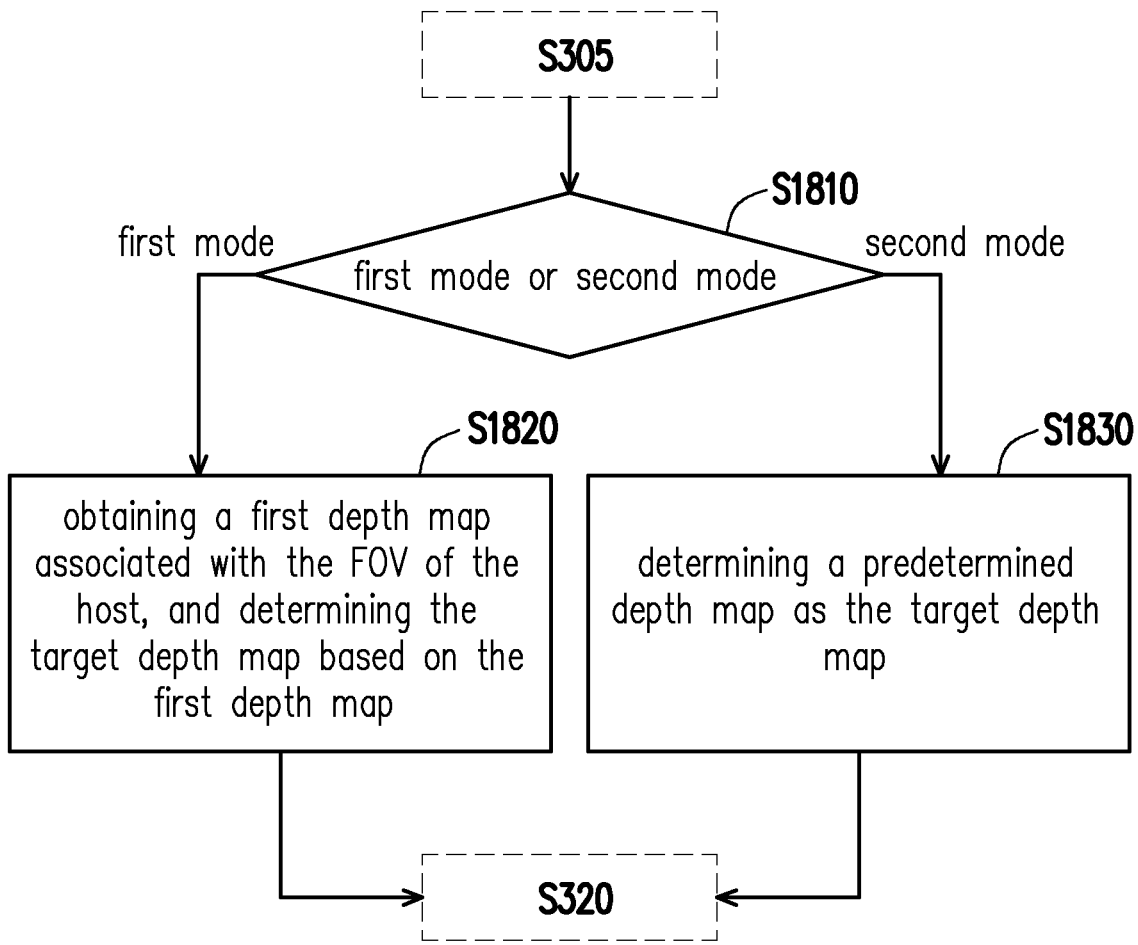
FIG. 18 shows a mechanism for determining target depth map according to a third embodiment of the disclosure.

See FIG. 18, which shows a mechanism for determining target depth map according to a third embodiment of the disclosure.

In the embodiment, after performing step S305 in FIG. 3, the processor 204 may perform step S310 by using the steps in FIG. 18.

In step S1810, the processer 204 determines whether the selected mode is the first mode or the second mode. In one embodiment, in response to determining that the selected mode is the first mode, the processor 204 may proceed to step S1820. In another embodiment, in response to determining that the selected mode is the second mode, the processor 204 may proceed to step S1830.

In step S1820, the processor 204 obtains a first depth map associated with the FOV of the host 200, and determines the target depth map based on the first depth map. In various embodiments, the processor 204 may determine the first depth map and the corresponding target depth map by using the mechanisms associated with the first mode in the above embodiments, which would not be repeated herein.

In step S1830, the processor 204 determines a predetermined depth map as the target depth map. In one embodiment, the predetermined depth map may have a uniform depth value. In this case, all pixels in the predetermined depth map have the same depth value (e.g., 2 m), but the disclosure is not limited thereto.

In the third embodiment, after obtaining the target depth map, the processor 204 may proceed to step S320 in FIG. 3 to accordingly determine the pass-through view.

That is, in the third embodiment, when the selected mode is the first mode, the processor 204 may use the mechanisms associated with the first mode in the above embodiments to determine the corresponding target depth map, such that the scale/position of the tracker in the corresponding pass-through view would be accurate. However, when the selected mode is the second mode, the processor 204 may directly use the predetermined depth map as the target depth map, and the corresponding pass-through view would still have no distortion, such that the user can have a better visual experience.

In summary, different from the conventional way of providing only one mode of generating the pass-through view, the embodiments of the disclosure provide a solution that allows the developer to choose the preferred mode from the first mode and the second mode based on the used strategy (e.g., maintaining the correctness of position/scale of the tracker in the rendered pass-through view or providing a non-distorted pass-through view), such that the development can be more flexible.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for generating a pass-through view in response to a selected mode, applied to a host, comprising:
   determining, by the host, the selected mode among a first mode and a second mode, wherein the first mode aims to achieve a control accurateness, and the second mode aims to achieve a visual smoothness;
   determining, by the host, a target depth map according to the selected mode; and
   rendering, by the host, the pass-through view based on an image associated with a field of view (FOV) of the host, a camera parameter, and the target depth map.

2. The method according to claim 1, wherein determining the target depth map according to the selected mode comprises:
   obtaining a first depth map associated with the FOV of the host, wherein the first depth map comprises at least one valid region;
   determining tracker information associated with the tracker;
   determining scene information based on the at least one valid region within the first depth map, the tracker information, and a host position of the host;
   generating a second depth map selectively based on the tracker information and scene information in response to the selected mode; and
   determining the second depth map as the target depth map.

3. The method according to claim 2, wherein determining the tracker information associated with the tracker comprises:
   tracking a tracker pose of a reference point on the tracker;
   obtaining a tracker model of the tracker, wherein the tracker model comprises a plurality of model points comprising the reference point;
   determining a pose of each of the plurality of model points based on the tracker pose of the reference point and a relative position between the reference point and each of the plurality of model points; and
   determining the plurality of model points with the corresponding pose as the tracker information associated with the tracker.

4. The method according to claim 2, wherein the tracker information comprises a plurality of tracker points, the scene information comprises a plurality of scene points, and determining the scene information based on the at least one valid region within the first depth map, the tracker information, and the host position of the host comprises:

determining a plurality of first points via projecting the at least one valid region within the first depth map into a space;
determining a plurality of second points via removing an interfering point from the plurality of first points; and
determining the plurality of second points as the plurality of scene points.

5. The method according to claim 4, wherein before determining the plurality of second points as the plurality of scene points, the method further comprises:
adding a plurality of historical scene points into the plurality of second points.

6. The method according to claim 4, wherein before determining the plurality of second points as the plurality of scene points, the method further comprises:
applying a temporal filter to the plurality of second points.

7. The method according to claim 2, wherein the tracker information comprises a plurality of tracker points, the scene information comprises a plurality of scene points, and generating the second depth map selectively based on the tracker information and scene information in response to the selected mode comprises:
initiating an intermediate depth map;
in response to determining that the selected mode is the first mode, updating the intermediate depth map via projecting the plurality of tracker points and the plurality of scene points to a reference position;
in response to determining that the selected mode is the second mode, updating the intermediate depth map via projecting the plurality of scene points to the reference position; and
determining the second depth map via smoothing the intermediate depth map.

8. The method according to claim 7, wherein initiating the intermediate depth map comprises:
copying a part of a historical depth map as the initiated intermediate depth map, wherein the part of the historical depth map comprises at least one depth point, and a depth of each of the at least one depth point is larger than a depth threshold, wherein the historical depth map is the second depth map corresponding to a historical time point.

9. The method according to claim 2, wherein before determining the scene information based on the at least one valid region within the first depth map, the tracker information, and the host position of the host, the method further comprises:
updating the first depth map based on the tracker information.

10. The method according to claim 9, wherein the tracker information comprises a plurality of tracker points, and updating the first depth map based on the tracker information comprises:
determining a tracker region within the first depth map via projecting the plurality of tracker points onto the first depth map; and
updating the first depth map via setting the tracker region as invalid.

11. The method according to claim 1, wherein determining the target depth map according to the selected mode comprises:
obtaining a first depth map associated with a field of view (FOV) of the host;
determining tracker information associated with the tracker;
modifying the first depth map into a second depth map according to the tracker information and the selected mode, wherein the second depth map comprises at least one valid region; and
determining the target depth map based on the second depth map.

12. The method according to claim 11, wherein the tracker information comprises a plurality of tracker points, and modifying the first depth map into the second depth map according to the tracker information and the selected mode comprises:
determining a tracker region within the first depth map via projecting the plurality of tracker points onto the first depth map;
in response to determining that the selected mode is the first mode, determining a first tracker region within the first depth map based on the tracker region and modifying the first depth map into the second depth map via setting the first tracker region as invalid;
in response to determining that the selected mode is the second mode, determining a second tracker region within the first depth map based on the tracker region and modifying the first depth map into the second depth map via setting the second tracker region as invalid, wherein the first tracker region is different from the second tracker region.

13. The method according to claim 11, wherein determining the target depth map based on the second depth map comprises:
determining scene information based on the at least one valid region within the second depth map;
initiating an intermediate depth map;
updating the intermediate depth map selectively based on the tracker information and the scene information in response to the selected mode;
determining the target depth map via smoothing the intermediate depth map.

14. The method according to claim 13, wherein the tracker information comprises a plurality of tracker points, the scene information comprises a plurality of scene points, wherein updating the intermediate depth map selectively based on the tracker information and the scene information in response to the selected mode comprises:
in response to determining that the selected mode is the first mode, updating the intermediate depth map via projecting the plurality of tracker points and the plurality of scene points to a reference position; and
in response to determining that the selected mode is the second mode, updating the intermediate depth map via projecting the plurality of scene points to the reference position.

15. The method according to claim 13, wherein the scene information comprises a plurality of scene points, and determining the scene information based on the at least one valid region within the second depth map comprises:
determining the plurality of scene points via projecting the at least one valid region within the second depth map into a space.

16. The method according to claim 11, wherein determining the target depth map based on the second depth map comprises:
determining a transforming function based on a reference position and the camera parameter;
transforming the second depth map into an intermediate depth map via applying the transforming function to the second depth map; and determining the target depth map via smoothing the intermediate depth map.

17. The method according to claim 1, wherein determining the target depth map according to the selected mode comprises:
in response to determining that the selected mode is the first mode, obtaining a first depth map associated with a field of view (FOV) of the host, and determining the target depth map based on the first depth map; and
in response to determining that the selected mode is the second mode, determining a predetermined depth map as the target depth map.

18. The method according to claim 17, wherein the predetermined depth map has a uniform depth value.

19. The method according to claim 1, wherein rendering the pass-through view based on the image associated with the FOV of the host, the camera parameter, and the target depth map comprises:
warping the image associated with the FOV into the pass-through view based on the camera parameter and the target depth map.

20. A host, comprising:
a non-transitory storage circuit, storing a program code; and
a processor, coupled to the non-transitory storage circuit and accessing the program code to perform:
determining a selected mode among a first mode and a second mode, wherein the first mode aims to achieve a control accurateness, and the second mode aims to achieve a visual smoothness;
determining a target depth map according to the selected mode; and
rendering the pass-through view based on an image associated with a field of view (FOV) of the host, a camera parameter, and the target depth map.

* * * * *